P. PRYIBIL.
Turning Ovals.

No. 94,130.

Patented Aug. 24, 1869.

Witnesses:

Inventor:

United States Patent Office.

PAUL PRYIBIL, OF NEW YORK, N. Y.

Letters Patent No. 94,130, dated August 24, 1869.

IMPROVEMENT IN MACHINE FOR TURNING OVALS.

The Schedule referred to in these Letters Patent and making part of the same.

*To all whom it may concern:*

Be it known that I, PAUL PRYIBIL, of the city, county, and State of New York, have invented a new and improved Machine for Turning Ovals; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
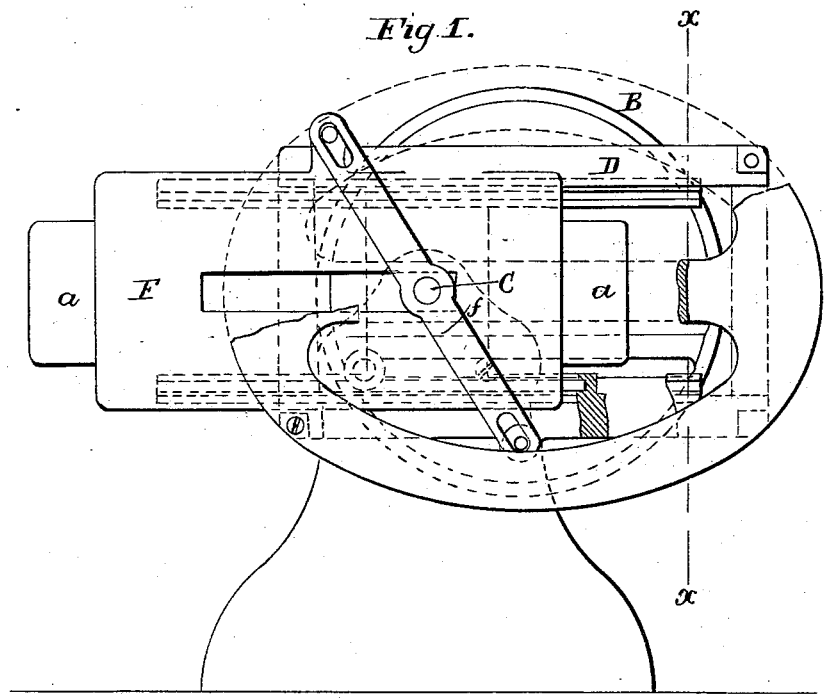
Figure 1 represents a sectional front view of this invention.
Figure 2:
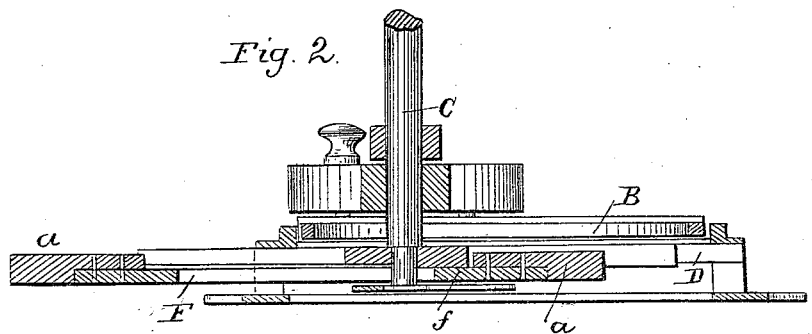
Figure 2 is a horizontal section of the same.
Figure 3:
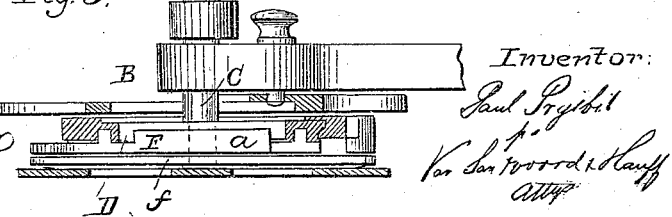
Figure 3 is a longitudinal section of the same, the line $x\,x$, fig. 1, indicating the plane of section.

This invention relates to a lathe for turning ovals, in which a self-balancing slide is connected with the movable face-plate of the lathe in such a manner that said slide forms a counterbalance for the face-plate and the work attached thereto, in whatever position the face-plate may be brought, and thereby a lathe is obtained, which can be run steady at considerable speed.

The difference in the weight of the different kind of work is made up by weights attached to the self-balancing slide.

In the drawing—

The letter D designates the face-plate of an eccentric lathe, the position and motion of which are determined and governed by a ring, B, which can be set concentric or eccentric with the spindle C, in the ordinary manner.

Into this face-plate is fitted a slide, F, which connects with said face-plate by a lever, $f$, that swings loosely on the end of the spindle C, and connects at one end with the slide, and at its opposite end with the face-plate, as shown, particularly in fig. 1 of the drawing.

By this arrangement the slide is compelled to move in a direction opposite to that in which the face-plate moves, and if the face-plate is moved out to the extreme end of its eccentricity in one direction, the slide moves precisely the same distance in the opposite direction, and forms a counterbalance for the face-plate in whatever position said face-plate may be brought.

If the work attached to the face-plate is light, the weight of the slide F is sufficient to counterbalance said work, together with the face-plate, but if the work is heavy I attach to the ends of the balance-slide the weights $a$. These weights are removable, and different sets will be provided, so that they can be selected to correspond to the weight of the work to be turned.

By these means a lathe for turning ovals is obtained, which runs steady at a considerable speed, whereas if the balance-slide is removed, and the lathe is run at the speed required for turning wood, it causes such a trembling motion that it becomes practically useless and exceedingly difficult to manage.

What I claim as new, and desire to secure by Letters Patent, is—

1. The balance-slide F, connected to the movable face-plate D of a lathe for turning ovals, by a lever, $f$, substantially in the manner shown and described.

2. The additional weights $a$, in combination with the balance-slide F, lever $f$, and face-plate D, substantially as set forth.

PAUL PRYIBIL.

Witnesses:
    W. HAUFF,
    E. F. KASTENHUBER.